March 17, 1925.                                                   1,529,785
H. W. HAMMOND ET AL
FUMIGATION
Filed April 30, 1923
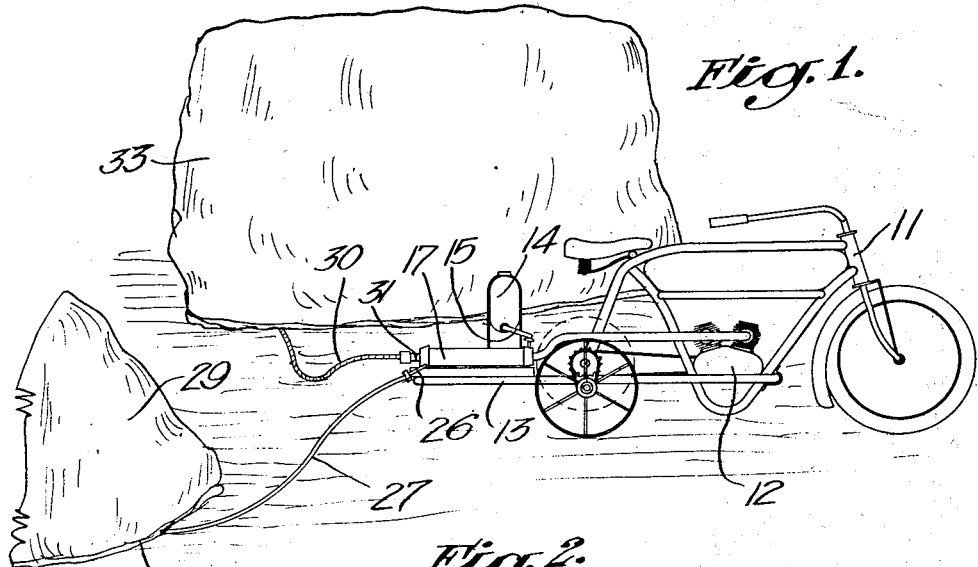
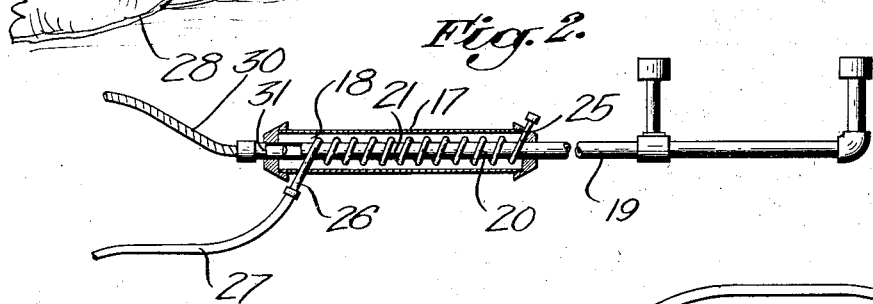
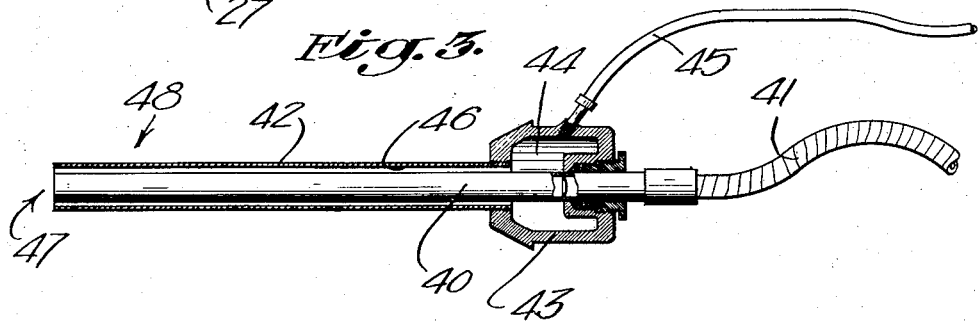
INVENTOR:
HARRY W. HAMMOND,
ARCHIE O. DAVIS,
BY
Graham + Harris
ATTORNEYS.

Patented Mar. 17, 1925.

1,529,785

UNITED STATES PATENT OFFICE.

HARRY W. HAMMOND AND ARCHIE O. DAVIS, OF HIGHLAND, CALIFORNIA, ASSIGNORS TO CALIFORNIA CYANIDE COMPANY, OF LOS ANGELES, CALIFORNIA, A CORPORATION OF CALIFORNIA.

FUMIGATION.

Application filed April 30, 1923. Serial No. 635,586.

*To all whom it may concern:*

Be it known that we, HARRY W. HAMMOND and ARCHIE O. DAVIS, both citizens of the United States, residing at Highland, county of San Bernardino, and State of California, have invented a new and useful Improvement in the art of Fumigation, of which the following is a specification.

This invention relates to the art of fumigation wherein insect and parasitic life is destroyed by subjection to the action of lethal gases. The invention has its particular utility in fumigating orchard trees, but it will be understood that there are many other uses to which it may be applied without departing from the essentials of the invention as hereinafter disclosed.

In the horticultural districts and particularly in those districts devoted to the growing of citrous fruits, it is customary to fumigate the trees at designated intervals. This fumigation is ordinarily accomplished in citrous orchard by enclosing the trees in separate portable tentlike covers, thus enclosing a space in and around the tree which may be filled with a lethal gas. The fumigating agent generally employed is hydrocyanic acid which volatilizes readily and is very destructive to insect and parasitic life. In order that the fumigation shall be effective, it is essential that the fumigating agent in gaseous form be thoroughly distributed throughout the spaces existing between the members of the tree being fumigated, and that this gas penetrate into all cracks and crevices in which the insect and parasitic life might exist. Orchard fumigation being ordinarily done at night, is proceeded with under low temperature conditions, the surfaces of the branches and leaves being cooled and presenting cold surfaces for the contact of lethal gases. When the heated gases introduced into the cold enclosure are brought into contact with cool surfaces, it results that a certain amount of condensation of the fumigating agent occurs, this condensation of course varying with the conditions of temperature and humidity surrounding the tree. It has been found difficult when fumigating at night to produce a complete penetration of the lethal gas throughout the intervening spaces between the parts of the tree owing to this partial condensation.

Our invention contemplates the use of a simple and effective means for raising the temperature within the fumigating space enclosed by a fumigating tent, so that when the vaporized lethal gases are introduced a minimum condensation will occur, therefore maintaining a maximum quantity of the lethal agent in vaporized condition, with the result that the circulation and penetration thereof throughout the fumigating space is effectively accomplished.

It is an object of the invention to provide a process and apparatus for fumigation wherein a vehicle is employed for transporting a supply of fumigating material from tree to tree throughout an orchard, this vehicle being driven by a combustion motor, and employing the heat contained in the exhaust gases from the combustion motor for the purpose of heating the fumigating enclosure within the tent placed over the tree to be fumigated. The heat of the exhaust gases from the combustion engine is imparted to this enclosed fumigating space by conveying exhaust gases directly into the enclosed space wherein the heat thereof is utilized for raising the temperature to a point which will support vaporization of the fumigating agent. The process further provides for the volatilization of the fumigating agent by the use of a portion of the heat contained in the exhaust gases from the combustion engine, the combustion gases thereafter being directed into the fumigating space to function as hereintofore described.

The especial advantages of our invention and further objects thereof will be made evident hereinafter.

Referring to the drawing which is for illustrative purposes only,

Fig. 1 is a perspective view showing a motor propelled vehicle employed for the purpose of conveying fumigating materials between different points of application, for furnishing heat for volatilizing the fumigating agent, and for raising the temperature within the fumigating tents.

Fig. 2 is a partially sectional view showing the arrangement we employ for transferring heat from the exhaust combustion gases to the fumigating agent for the purpose of volatilization.

Fig. 3 is an alternative form of device for volatilizing the fumigating agent.

Any type of vehicle, which may be conveniently driven by a combustion engine, may be employed in the practice of my invention. In Fig. 1 of the drawing a motor tricycle 11 is shown having as a driving means a simple combustion engine 12. Upon the platform 13 provided at the rear of the vehicle 11 is mounted an apparatus 14 for carrying a supply of hydrocyanic acid or other poisonous substance suitable for fumigating purposes. This container is of the standard type provided with a measuring device for delivering designated quantities or doses of the hydrocyanic acid. From the apparatus 14 a delivery pipe 15 extends to a volatilizer 17 which consists of a shell 18 through which the exhaust pipe 19 extends from the combustion engine 12. Within the shell 18 a tubular member 20 is spirally wound around the interior portion 21 of the exhaust pipe 19. The delivery pipe 15 from the apparatus 14 is connected to the inlet end 25 of the tubular member 20 and the hydrocyanic acid is directed through the spiral channel provided by the tubular member 20 and is delivered from the outlet end 26 of the tubular member into a gas delivery hose 27 through which the hydrocyanic acid in vaporized form is directed under the edge 28 of a tent 29 placed over a tree.

In Fig. 1 we show an exhaust hose 30 extending from the discharge end 31 of the exhaust pipe 19 under a tent 33 covering an adjacently located tree. With the arrangement shown the exhaust gases are directed under a tent in advance of the tent into which the vaporized lethal agent is being introduced. In this manner a preceding tent is being prepared, by the raising of the temperature therein, for the subsequent introduction of the vaporized lethal agent and at the same time the poisonous vapors are being injected under a tent which has previously had the temperature therein raised to a degree which will support the vaporization of the hydrocyanic acid or other lethal agent employed.

A certain amount of the heat contained in the exhaust gases from the combustion engine 12 is imparted by conduction directly to the tubular member 20 which is tightly wound upon the portion 21 of the exhaust pipe 19. The heat imparted to the tubular member 19 is absorbed by the poisonous liquid introduced into the spiral channel provided by the tubular member 20 so that the temperature thereof rises and volatilization results; therefore the lethal agent is directed in gaseous form through the gas hose 27 into the space enclosed by the tent 29. Owing to the fact that this space within the tent 29 has been previously heated in the manner described the lethal agent remains in gaseous form after its introduction and circulates throughout the tent and penetrates the intervening spaces between the branches and leaves of the tree wherein it comes in destructive contact with the insect and parasitic life harbored there.

It may be at times desirable to direct the exhaust gases and the vaporized fumigating agent simultaneously into the same tent. This may be accomplished by extending both the hoses 27 and 30 under the edges of the same tent, or the arrangement shown in Fig. 3 may be employed. This arrangement consists of a special form of nozzle having an inner pipe 40 through which the exhaust gases are directed from a hose 41 and an outer close fitting shell 42 which extends forwardly from a chambered body 43 mounted upon the central pipe 40. The lethal agent is delivered into the chamber 44 within the body 43 through a hose 45 and passes forwardly from this chamber through the annular space existing between the pipe 40 and the shell 42. In its passage through this annular space heat is imparted to the lethal agent from the walls of the exhaust pipe 40 with the result that it issues from the mouth 47 of the nozzle 48 in gaseous form. The exhaust gases issuing from the mouth of the pipe 40 impart further heat for sustaining the vaporized condition of the fumigating agent. In this manner the entire waste heat or in other words the heat contained in the exhaust gases from the combustion engine is usefully employed for the purpose of vaporizing and sustaining the vaporized condition of a poisonous fluid after its introduction into an enclosed space wherein its destructive action upon insect and parasitic life is required.

We claim as our invention:

1. In apparatus for orchard fumigation, the combination of: a vehicle for transporting a fumigating agent from one point of application to another; a combustion motor for propelling said vehicle; a container on said vehicle for poisonous fluid; means for employing the exhaust gases of said combustion motor for vaporizing a charge of fumigating agent; means for conveying the vaporized charge of fumigating agent into a fumigation enclosure; and means for conveying said exhaust gases into a fumigation enclosure for the purpose of raising the temperature therein to increase the action of the fumigating agent.

2. In apparatus for orchard fumigation, the combination of: a vehicle for transporting a fumigating agent from one point of application to another; a combustion motor for propelling said vehicle; a container on said vehicle for poisonous fluid; means for employing the exhaust gases of said combustion motor for vaporizing a charge of fumigating agent; means for conveying the vaporized charge of fumigating agent into one fumigation enclosure; and means for conveying said exhaust gases into a succeeding fumigation enclosure for the purpose of raising the temperature therein preparatory to the introduction of lethal gases.

3. In apparatus for orchard fumigation, the combination of: a vehicle for transporting a fumigating agent from one point of application to another; a combustion motor for propelling said vehicle; a container on said vehicle for poisonous fluid; a vaporizer employing heat from the exhaust gases; means for conveying the vaporized charge of fumigating agent into one fumigation enclosure; and means for conveying said exhaust gases into a succeeding fumigation enclosure for the purpose of raising the temperature therein preparatory to the introduction of lethal gases.

4. In apparatus for orchard fumigation, the combination of: a vehicle for transporting a fumigating agent from one point of application to another; a combustion motor for propelling said vehicle; and means for conveying exhaust gases from said combustion motor into a fumigation enclosure for the purpose of raising the temperature therein preparatory to the introduction of a fumigating agent.

5. The method of fumigation, comprising: employing a combustion motor for the transportation of fumigating agents from one point of application to another; and utilizing the heat of the exhaust gases from said combustion motor for raising the temperature within a fumigation enclosure.

6. The method of fumigation, comprising: employing a combustion motor for the transportation of fumigating agents from one point of application to another; utilizing heat from the exhaust gases from said combustion motor for vaporizing charges of said fumigating agent; and directing said exhaust gases into a fumigation enclosure for the purpose of raising the temperature therein preliminary to the introduction of said vaporized fumigating agent.

7. The method of fumigation, comprising: employing a combustion motor for the transportation of fumigating agents from one point of application to another; utilizing heat from the exhaust gases from said combustion motor for vaporizing charges of said fumigating agent; conveying said vaporized fumigating agent into a fumigation enclosure; and directing said exhaust gases into a succeeding fumigation enclosure for the purpose of raising the temperature therein preliminary to the introduction of said vaporized fumigating agent.

8. The method of fumigation which comprises employing the exhaust gases from a combustion motor for vaporizing a charge of fumigating agent, conveying the vaporized charge of fumigating agent into one fumigation enclosure, and conveying said exhaust gases into a succeeding fumigation enclosure for the purpose of raising the temperature therein preparatory to the introduction of lethal gases.

9. The method of fumigation which comprises utilizing heat from the exhaust gases from a combustion motor for vaporizing charges of a fumigating agent, and directing said exhaust gases into a fumigation enclosure for the purpose of raising the temperature therein preparatory to the introduction of said vaporized fumigating agent.

In testimony whereof, we have hereunto set our hands at Highland, California, this 21st day of April, 1923.

HARRY W. HAMMOND.
ARCHIE O. DAVIS.